June 5, 1956  H. NYQUIST  2,749,508
MEASUREMENT OF TRANSMISSION TIME
Filed July 26, 1952  2 Sheets-Sheet 1

FIG. I

INVENTOR
H. NYQUIST
BY H. A. Burgess
ATTORNEY

June 5, 1956            H. NYQUIST            2,749,508

MEASUREMENT OF TRANSMISSION TIME

Filed July 26, 1952                           2 Sheets-Sheet 2

INVENTOR
H. NYQUIST
BY
ATTORNEY

United States Patent Office 2,749,508
Patented June 5, 1956

2,749,508

MEASUREMENT OF TRANSMISSION TIME

Harry Nyquist, Millburn, N. J., assignor to Bell Telephone Laboratories, Incorporated, New York, N. Y., a corporation of New York Application July 26, 1952, Serial No. 301,127

4 Claims. (Cl. 324—58)

The present invention relates to the measurement of the transmission time of an electrical path or circuit and aims to increase the accuracy of such measurement obtainable with a limited amount of equipment.

The circuit under measurement is included in a closed loop so as to provide for the round-trip propagation of wave pulses. A wave is started through the loop and upon its return to the starting point the front of the wave cuts off the wave supply so that a space ensues. As the trailing end of the wave returns to the starting point it again starts a wave along the path, and this process continues for as long as desired.

The time required for the wave to traverse the loop is proportional to the rate at which the changes from current to space and vice versa occur at a point of observation such as the starting point referred to. This rate can be determined relatively easily. If the loop contains delay other than that possessed by the path under measurement, suitable allowance can be made for such excess delay time.

Figure 1:
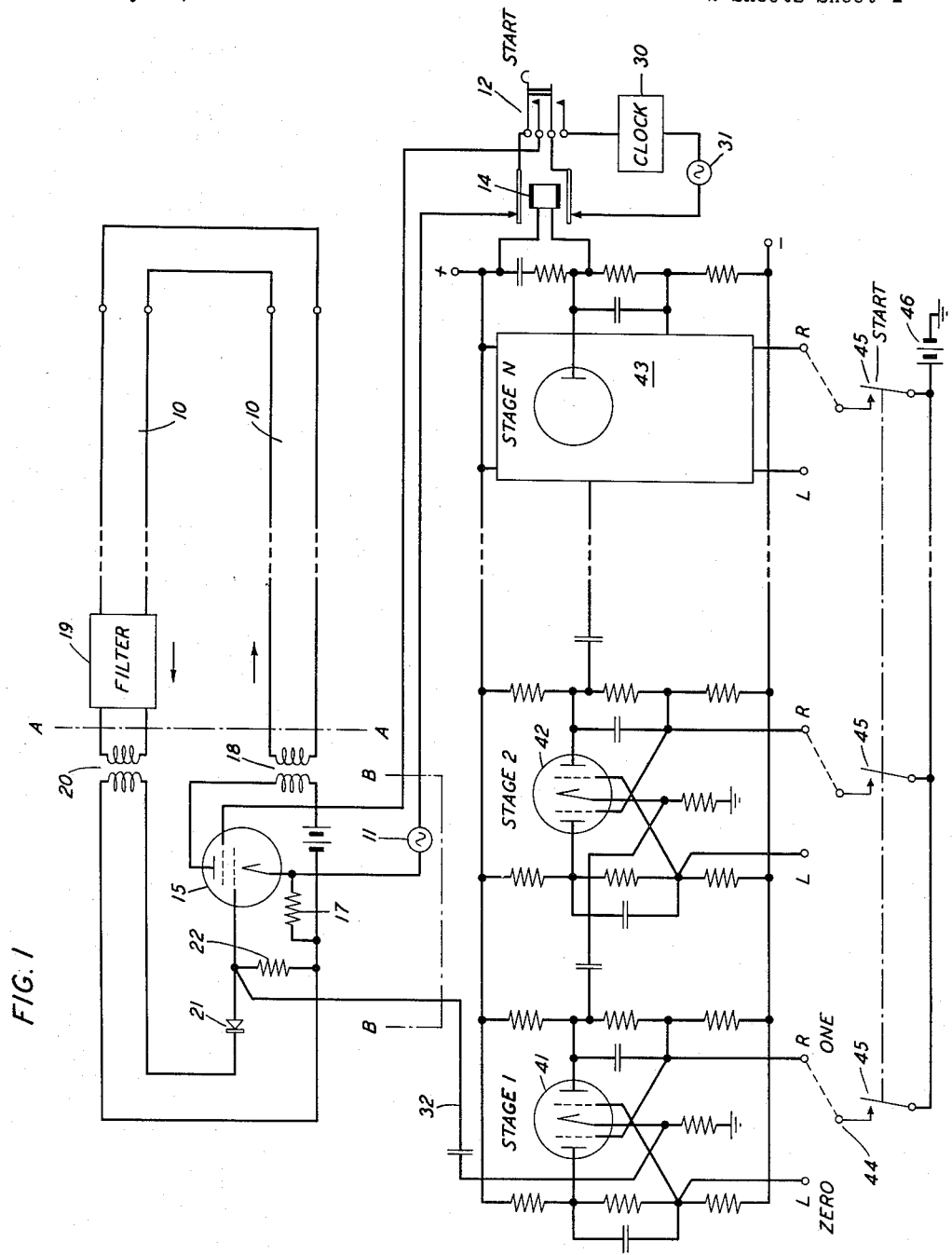

Referring to the drawing, Fig. 1 is a schematic circuit diagram of a system according to the invention for measuring the transmission time of a four-wire line.

Figure 2:
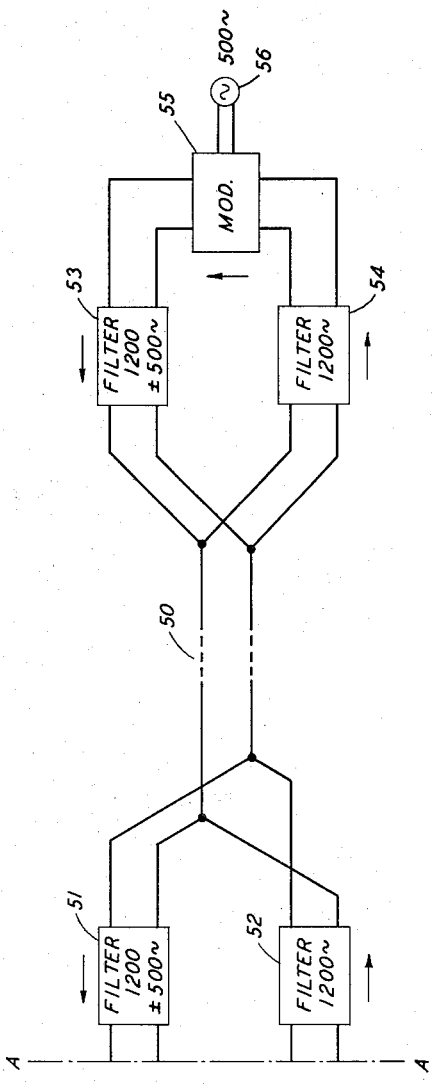
Figure 3:
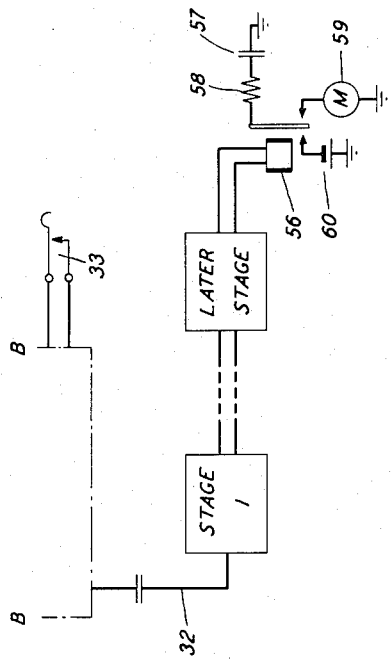

Fig. 2 shows in diagram the circuit changes necessary to adapt the circuit of Fig. 1 to use for measuring the transmission time of a two-wire circuit by substituting the Fig. 2 circuit for the portion of Fig. 1 to the right of line A—A; and Fig. 3 shows a modification to be made in Fig. 1 by substituting Fig. 3 for the portion below line B—B.

A typical example of line with which the invention may be used is a picture-transmission line using a carrier wave having a frequency of 1200 cycles per second, and such a line will be assumed in the description, for illustration.

In Fig. 1 the line 10 is a telephone or telegraph line suitable for picture transmission and may be of any suitable length such as a toll line. At the far end (right-hand end) the terminals of the east and west sides of the line are strapped together to form a round-trip path.

A source of carried waves of 1200 cycles frequency is shown at 11. When start key 12 is depressed, waves from source 11 are applied to the outer grid of tube 15, relay 14 being normally closed. This tube has a normal negative grid bias supplied from resistor 17, which alone is assumed to be applied at this time. The 1200 cycle wave is amplified by tube 15 and sent through output transformer 18 into the east branch of line 10. It traverses both line branches and returns through filter 19 which passes a band about 400 cycles wide centered at 1200 cycles. The wave then is applied to rectifier 21 through windings 20 and the rectified current makes the upper or grid terminal of resistor 22 so far negative as to bias tube 15 to or beyond cut-off, stopping the transmission of the wave from source 11 to line.

In this manner a wave pulse of a definite length has been sent out from source 11, the length of this pulse being equal to the transmission time around the closed path or loop back to the starting point.

The tube 15 remains cut off only so long as the wave continues to be received through filter 19 and coil 20. Thus the no-current or space condition at the input coil 18 has a length equal to the transmission time around the closed path. When the trailing end of the pulse of carrier wave finally reaches the rectifier 21 the bias provided by rectification is removed and tube 15 again begins to send out a new pulse of carrier. This process continues until interrupted in the manner to be described, resulting in the transmission of alternate wave trains and spaces of equal length.

When start key 12 was closed as described, the clock 30 was started by having applied to it a 60-cycle wave from source 31 over a circuit including normal lower contact of relay 14 and lower contact of key 12. The clock begins, therefore, to time the total period during which the pulses of carrier wave are sent out.

In order to count the number of pulses and spaces sent out during a measured time interval, a counting circuit is provided consisting of a series of multivibrator stages of usual or known type, these being shown as comprising tubes 41, 42 etc. Any suitable or necessary number of these stages may be provided.

The chain begins to count when the first pulse, after starting, is applied to the cathode of tube 41 from the rectifier 21 over conductor 32. When the final stage "N" is operated, relay 14 receives current from the output plate of that stage and stops the clock 30 by interrupting its driving circuit at the lower relay contact. At its upper contact relay 14 opens the circuit which supplies carrier waves to tube 15.

The transmission time of the closed loop circuit including line 10, 10 is determined by dividing the clock indication in seconds by twice the number counted in the counting chain, since the time between each pulse sent over conductor 32 into the chain and the next pulse represents the time required to send both a pulse and a space around the loop. The transmission time for one side of the loop (one line 10) is half that for the four-wire line. It is assumed that the transmission delay through filter 19 is known, in which case it can be subtracted as a correction factor.

The counting chain shown is driven by the application of positive pulses to the cathode terminal of a respective stage. Negative pulses have no effect. Each multivibrator stage has two stable conditions, and its initial condition is determined by the strapping that is used between terminal 44 of the start switch 45 and the "zero" or "one" terminal of that stage.

When start key 45 (ganged to all stages) is momentarily closed, positive voltage from source 46 is applied to one grid of each stage, either of the right-hand side or the left-hand side depending upon the strapping used to terminal 44. This voltage so applied causes that side of the respective tube to conduct and the opposite side to be cut off by the well-known interaction between the two sides of a multivibrator. Assuming stages 1 and 2 to be strapped, to count one as shown, and the start key 45 to have been closed and released, the left side of each stage is conducting and the right side cut off.

The first positive pulse received from rectifier 21 causes the already conducting side of stage 1 (left side) to cut off whereupon the right side conducts and counts one. The next positive pulse restores the first stage to normal and applies a positive pulse to the cathode of stage 2 (tube 42) causing that stage to count 1. The third positive pulse restores stage 2 to normal and the fourth positive pulse causes stage 3 to count 1. It is seen that the chain counts in terms of binary numbers the first stage corresponding to $2^0$. This type of counter is known in the art and has been described as an aid to understanding how it can be used in the practice of the invention.

As already stated, when the counting has proceeded to the point when the Nth stage counts one, relay 14 operates to stop the clock 30 and cut off the transmission of carrier waves. The time of running of the clock is then twice the round-trip delay multiplied by the number of pulses counted.

If we wish each minute of clock running time to correspond to one millisecond of one-way delay the number counted must be 15,000. This can be accomplished by having fifteen stages and presetting the counter suitably. $2^{14}=16,384$, $16,384-15,000=1,384$. The counter should be preset to a count of 1,384, which can be accomplished by presetting the 11th, 9th, 7th, 6th, and 4th stages to 1 and all the others to 0. If we wish 10 seconds to correspond to 1 millisecond, the number counted must be 2,500. This requires thirteen stages with the 11th, 10th, 6th, 5th, 4th, and 3rd stages preset to 1. If a special clock were employed so constructed that the fastest hand made one revolution per second with the dial perhaps divided into 100 parts, then one second could be made to correspond to 1 millisecond, and the required count would be 250. This would require 9 stages with the 2nd and 3rd preset to 1. It would, of course, be possible to have a 15 stage counter count 15,000 at times and 2,500 at times by using two presettings alternatively.

The delay of the filter is added once per cycle to the delay that is to be measured. Moreover, there is a delay when the count is completed because the relay is not instantaneous. The clock does not start and stop instantaneously. There is a tendency for compenstaion but the compensation may not be exact. All these sources of error may be compensated to a high degree by making a delay measurement with no line or with a resistance network. The reading thus obtained should be subtracted from the reading obtained with the line in place.

In Fig. 2 the two-way line 50 is provided with four-wire terminations comprising two filters 51 and 52 at the near end and a similar pair of filters 53, 54 at the far end. A frequency shift circuit comprising modulator 55 and shift source 56 is placed between the corresponding terminals of filters 53 and 54. Transmission toward the far end takes place at a frequency of 1200 cycles. Transmission in the reverse direction takes place at a frequency of 1200±500 cycles. In this system additonal delays are contributed by the greater number of filters and by the modulator 55. Correction for this delay must be made.

In Fig. 3 means is provided for directly measuring the rate of the pulses instead of measuring the time of receipt of a known number of pulses. The pulses as in Fig. 1, are received over conductor 32 when key 33 is closed, and they could operate relay 56 directly if the relay had a sufficiently short response time. However since very short delay-times may need to be measured, it may be preferable in many cases to use a few stages of multivibrators similar to those in Fig. 1 in order to reduce the rate of pulses applied to the relay. Two or three stages may suffice.

As the relay vibrates its armature between opposite contacts, condenser 57 alternately receives from battery 60, and gives up, charges to actuate meter 59 which is a direct-current meter with damping. Resistance 58 governs the rate of charge and discharge. Meter 59 can be calibrated in transmission times, for example in milliseconds, since its registration is proportional to rate of pulsing of relay 56.

The invention is not to be construed as restricted to the detailed disclosure nor to the numerical values given, these being illustrative and by way of example rather than limiting, and various modifications can be made within the spirit and scope of the invention.

What is claimed is:

1. In a system for the measurement of the transmission time of a circuit or path, a wave source, switching means responsive to the presence of a wave train at one end of the said circuit serving as the receiving end to hold the wave source disconnected from the other or transmitting end as long as a wave train is present at the receiving end and responsive to the absence of a wave train at the receiving end to hold the wave source connected to the transmitting end as long as no wave train is present at the receiving end, whereby spaced wave trains are generated at a time rate determined by the transmission time of the circuit, timing means, starting means for initially connecting the wave source to the said switching means and for simultaneously starting the timing means, counting means actuated by said switching means to count individual wave trains at the receiving end of the circuit to be measured, and means to stop the timing means upon completion of a predetermined count by said counting means.

2. In a system for the measurement of the transmission time of a circuit or path, a wave source, switching means for connecting said wave source to one end of the circuit to be measured, said end serving as the transmitting end, timing means, starting means for initially connecting the wave source to said switching means while simultaneously starting the timing means, a rectifier connected to the other or receiving end of the circuit to be measured and to said switching means and so poled as to actuate the latter to disconnect the wave source from the transmitting end whenever a wave train is being received at the receiving end and to connect the wave source to the transmitting end whenever no wave train is present at the receiving end, thereby generating spaced trains at a time rate determined by the transmission time of the circuit to be measured, counting means actuated by said rectifier to count individual wave trains received at the receiving end, and means to stop the timing means upon completion of a predetermined count by said counting means.

3. In a system for the measurement of the transmission time of a circuit or path, a wave source, an amplifier connected to feed into one end of said circuit, a clock, means simultaneously to start the clock and to connect the wave source to the amplifier for beginning a measurement, switching means actuated by the presence of a wave train at the other end of the circuit to be measured to hold said amplifier disabled and by the absence of a wave train at the same point to hold said amplifier operative whereby wave trains are generated that are equal in length to the length of the circuit to be measured and are separated by spaces of length equal to the length of a wave train, electrical counting means actuated by said switching means to count individual wave trains at the location of said switching means, and means to stop the clock upon completion of a predetermined count by said counting means.

4. In a system for the measurement of the transmission time of a circuit or path, a wave source, an amplifier tube having two control grids and an output circuit, said output circuit being connected to one end of the circuit to be measured, said end serving as the transmitting end, timing means, starting means for initially connecting the wave source to one of said control grids while simultaneously starting the timing means, a rectifier connected to the other or receiving end of the circuit to be measured and to the other control grid, the rectifier being poled in the direction necessary to render said last mentioned grid more negative upon excitation of the rectifier by a wave train received from the circuit to be measured, whereby the rectifier is responsive to the presence of a wave train at the receiving end to hold the amplifier disabled whenever a wave train is being received from said circuit by the rectifier and responsive to the absence of a wave train at the receiving end to hold the amplifier in operative condition whenever no wave train is present at the receiving end, thereby generating spaced wave trains at a time rate determined by the transmission time of the circuit to be measured, counting means actuated by said rectifier to count individual wave trains received by the rectifier, and means to stop the timing means upon completion of a predetermined count by said counting means.

References Cited in the file of this patent

UNITED STATES PATENTS

| | | |
|---|---|---|
| 1,748,171 | Clark | Feb. 25, 1930 |
| 2,083,344 | Neuhouse | June 8, 1937 |
| 2,428,799 | Hayes | Oct. 14, 1947 |
| 2,467,299 | Espenschild | Apr. 12, 1949 |
| 2,568,926 | Moran | Sept. 25, 1951 |